United States Patent
Matsumura et al.

(10) Patent No.: US 12,245,156 B2
(45) Date of Patent: Mar. 4, 2025

(54) TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Shaozhen Guo, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 354 days.

(21) Appl. No.: 17/774,625

(22) PCT Filed: Nov. 6, 2019

(86) PCT No.: PCT/JP2019/043512
§ 371 (c)(1),
(2) Date: May 5, 2022

(87) PCT Pub. No.: WO2021/090405
PCT Pub. Date: May 14, 2021

(65) Prior Publication Data
US 2022/0394622 A1    Dec. 8, 2022

(51) Int. Cl.
*H04W 52/02* (2009.01)
(52) U.S. Cl.
CPC .............. *H04W 52/0274* (2013.01)
(58) Field of Classification Search
CPC ... H04W 52/0274; H04W 52/02; Y02D 30/70
USPC ........................................... 370/311
See application file for complete search history.

(56) References Cited

U.S. PATENT DOCUMENTS

| | | | |
|---|---|---|---|
| 2010/0279625 A1 | 11/2010 | Ko et al. | |
| 2011/0306383 A1 | 12/2011 | Lee et al. | |
| 2014/0003278 A1 | 1/2014 | Banister et al. | |
| 2020/0169995 A1* | 5/2020 | Nam | H04W 72/044 |
| 2021/0045147 A1* | 2/2021 | Zhou | H04L 5/0098 |
| 2022/0123818 A1 | 4/2022 | Li | |

FOREIGN PATENT DOCUMENTS

| | | |
|---|---|---|
| CN | 109983797 A | 7/2019 |
| JP | 2012-518942 A | 8/2012 |
| JP | 2014-239465 A | 12/2014 |

OTHER PUBLICATIONS

International Search Report issued in PCT/JP2019/043512 on Jul. 7, 2020 (2 pages).
Written Opinion of the International Searching Authority issued in PCT/JP2019/043512 on Jul. 7, 2020 (4 pages).

(Continued)

*Primary Examiner* — Mang Hang Yeung
(74) *Attorney, Agent, or Firm* — Osha Bergman Watanabe & Burton LLP

(57) ABSTRACT

A terminal according to one aspect of the present disclosure includes a control section that determines whether to power on or off each panel of a plurality of panels and switches power of the panel to ON or OFF, a receiving section that receives a signal by using the panel being powered on, and a transmitting section that transmits a signal by using the panel being powered on. According to one aspect of the present disclosure, it is possible to suppress power consumption of a panel.

8 Claims, 7 Drawing Sheets

(56) References Cited

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E- UTRAN); Overall description; Stage 2 (Release 8)"; Mar. 2010 (149 pages).
Office Action issued in counterpart Chinese Patent Application No. 201980103427.5 mailed on Aug. 8, 2024 (11 pages).
Interdigital, Inc.; "Views on Panel Activation and Deactivation"; 3GPP TSG RAN WG1 #98, R1-1908233; Prague, CZ; Aug. 26-30, 2019 (5 pages).
Huawei, HiSilicon; "Enhancements on multi-beam operation"; 3GPP TSG RAN WG1 Meeting #98, R1-1908067; Prague, Czech Republic; Aug. 26-30, 2019 (20 pages).
China Telecom; "Enhancements on multi-beam operation"; 3GPP TSG RAN WG1 #98, R1-1908886; Prague, CZ; Aug. 26-30, 2019 (5 pages).

\* cited by examiner

TERMINAL AND RADIO COMMUNICATION METHOD

TECHNICAL FIELD

The present disclosure relates to a terminal and a radio communication method in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "New Radio (NR)," "3GPP Rel. 15 (or later versions)," and so on) are also under study.

In existing LTE systems (e.g., 3GPP Rel. 8 to Rel. 14), a user terminal (User Equipment (UE)) transmits uplink control information (UCI) by using at least one of a UL data channel (e.g., a Physical Uplink Shared Channel (PUSCH)) and a UL control channel (e.g., a Physical Uplink Control Channel (PUCCH)).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In Rel. 15, for supporting beam management (BM), a UE keeps a plurality of panels in a power on state. Keeping the panels in the power on state allows the UE, when a communication speed of a panel being currently in use decreases due to an obstacle or the like, to switch the panel to another panel. However, keeping the plurality of the panels in the power on state causes an issue that increases power consumption.

Thus, an object of the present disclosure is to provide a terminal and a radio communication method that can suppress power consumption of a panel.

Solution to Problem

A terminal according to one aspect of the present disclosure includes a control section that determines whether to power on or off each panel of a plurality of panels and switches power of the panel to ON or OFF, a receiving section that receives a signal by using the panel being powered on, and a transmitting section that transmits a signal by using the panel being powered on.

Advantageous Effects of Invention

According to one aspect of the present disclosure, it is possible to suppress power consumption of a panel.

DESCRIPTION OF EMBODIMENTS

Figure 1:
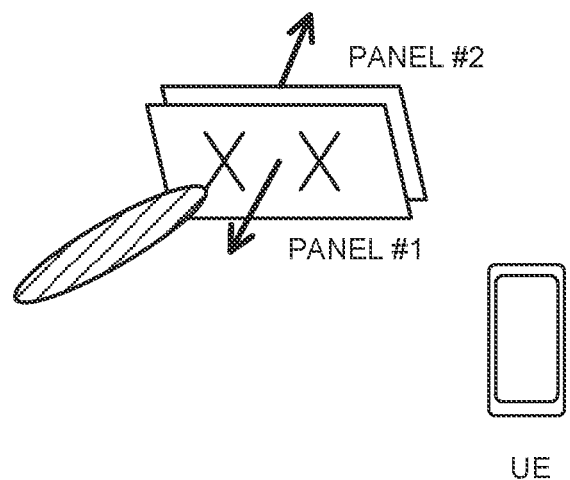
FIG. 1 is a diagram to show use of panels of a UE in 3GPP Rel. 15.

FIG. 1 is a diagram to show use of panels of a UE in 3GPP Rel. 15. In Rel. 15, selection/usage of uplink (UL) panels of a user terminal (User Equipment (UE)) is transparent to a network (NW, for example, a base station or gNB). The UE uses only one panel for single UL transmission, and does not simultaneously use a plurality of panels. In an example shown in FIG. 1, the UE uses Panel #1 for UL transmission. The UE can dynamically switch between panels to be used by using an implicit method (notification) and uses the panels.

However, in Rel. 15, for supporting beam management, the UE keeps the plurality of the panels in a power on state. The UE keeps the panels in a power on state, and thus can, when a communication speed of a panel being currently in use decreases due to an obstacle or the like, quickly switch the panel to another panel, thereby improving performance. However, keeping the plurality of the panels in a power on state causes an issue that increases power consumption and reduces efficiency.

Thus, the inventors of the present invention came up with the idea of a terminal including a control section that determines whether each panel of a plurality of panels is powered on or off and switches the panel to ON or OFF, a receiving section that receives a signal by using the panel being powered on, and a transmitting section that transmits a signal by using the panel being powered on. According to one aspect of the present disclosure, it is possible to suppress power consumption of a panel.

Hereinafter, embodiments according to the present disclosure will be described in detail with reference to the drawings. The radio communication methods according to respective embodiments may each be employed individually, or may be employed in combination. Note that in the present disclosure, "A/B" may be interpreted as "at least one of A and B." Note that "notification" in the present disclosure may be interpreted interchangeably as "indication," "configuration," and "transmission."

Hereinafter, a "panel" of a UE in the present disclosure may be interpreted interchangeably as a "Reference Signal (RS) port group," a "Demodulation Reference Signal (DMRS) port group," a "Sounding Reference Signal (SRS)

port group," an "RS resource group," a "DMRS resource group," an "SRS resource group," a "beam group," a "Transmission Configuration Indication (TCI) state group," a "spatial relation group," an "SRS resource indicator (SRI) group," or an "antenna port group."

"A panel is powered on" in the present disclosure means an active state of the panel, and may mean at least one of a state in which blind detection of a downlink control channel (Physical Downlink Control Channel (PDCCH)) can be performed in a configured search space, a state in which a downlink shared channel (Physical Downlink Shared Channel (PDSCH)) scheduled by downlink control information (DCI) or the like from a NW can be received, and a state in which a UL data channel (e.g., a Physical Uplink Shared Channel (PUSCH)) scheduled by DCI or the like from the NW.

"A panel is powered off" in the present disclosure means an inactive state of the panel, and may mean at least one of a state in which blind detection of the PDCCH is not requested in the configured search space, a state in which reception of the PDSCH scheduled by the DCI or the like from the NW is not requested, and a state in which transmission of the PUSCH scheduled by the DCI or the like from the NW is not requested.

In the present disclosure, whether the panel is actually powered on or off (whether the panel is energized) may depends on UE implementation. For example, the UE having high power consumption efficiency (efficiency being a certain value or more) may be actually powered on (energize) the panel even in a state in which "a panel is powered off" in the present disclosure.

(Radio Communication Method)

First Embodiment

In a first embodiment, the UE receives configuration information related to a panel from the base station. The configuration information is information indicating powering on (activation)/off (deactivation) the panel, and may be configured for each panel. The UE determines whether the panel is powered on or off on the basis of the configuration information and switches the panel to ON or OFF. The UE performs transmission/reception of a signal by using the panel being powered on.

In the present disclosure, letting the number of panels the UE has be M and letting the number of panels the UE can switch be N, 0≤N≤M is assumed to be satisfied. In other words, only some of the panels the UE has may be switchable. The UE may semi-statically perform switching of ON/OFF of the panel. For example, an interval between switching of ON/OFF of the panel may be a certain period or more.

(Method 1-1)

The UE may receive configuration information for each panel configured by the base station by using higher layer signaling (e.g., Radio Resource Control (RRC) signaling). This configuration information may indicate an ON or OFF state of each panel. This configuration information may be information configured on the basis of at least one of a UE report related to panel information, a Radio Resource Management (RRM) measurement result, and a physical layer (Layer 1 (L1)) measurement result.

(Method 1-2)

The base station may indicate the configuration information for each panel of the UE by using a MAC control element (Medium Access Control Control Element (MAC CE)) or both of RRC signaling and the MAC CE. When the UE report indicates that the number of panels is 4, the configuration information may indicate an ON/OFF state of each panel by using a 4-bit bitmap.

In the MAC CE, powering on/off the panel is configured by a m-bit bitmap. m may be determined by specifications beforehand, or may be configured depending on the number of panels configured by RRC. Alternatively, powering on/off the panel may be configured by a panel identification (ID) configured by RRC. For example, only an ID for a target panel to be powered on or off may be configured by RRC.

(Method 1-3)

The base station may configure a timer for each UE or each panel to notify the UE of a state of the timer. The UE may perform control for powering on/off the panel on the basis of the notified state of the timer. For example, the UE may switch the panel to ON or OFF when the timer has expired (reached a configured time). The UE may switch the panel to ON (or OFF) when the timer is reactivated in a state in which the panel is powered off (or on).

For example, when beam/panel information about panel i is included in an RRM/L1 measurement result the UE has reported, the base station may reactivate a timer for panel i. When beam/panel information about panel j is not included in the RRM/L1 measurement result the UE has reported, there is a possibility that a timer for panel j expires after a certain period, and the UE may power off panel j.

(Method 1-4)

An ON/OFF state of the panel may be implicitly indicated by another parameter configured in the base station. For example, an ON/OFF state of panel j may be indicated by whether a panel ID (j) is configured for an RS (the panel is associated with the RS), whether an RS corresponding to panel j (aperiodic/semi-persistence/periodic) is configured for the RS, or whether spatial relation information corresponding to panel j is configured for the RS.

For example, MAC CE activation of a semi-persistent CSI-RS resource set corresponding to panel j may be regarded as signaling to indicate activation (powering on) of panel j.

Figure 2:
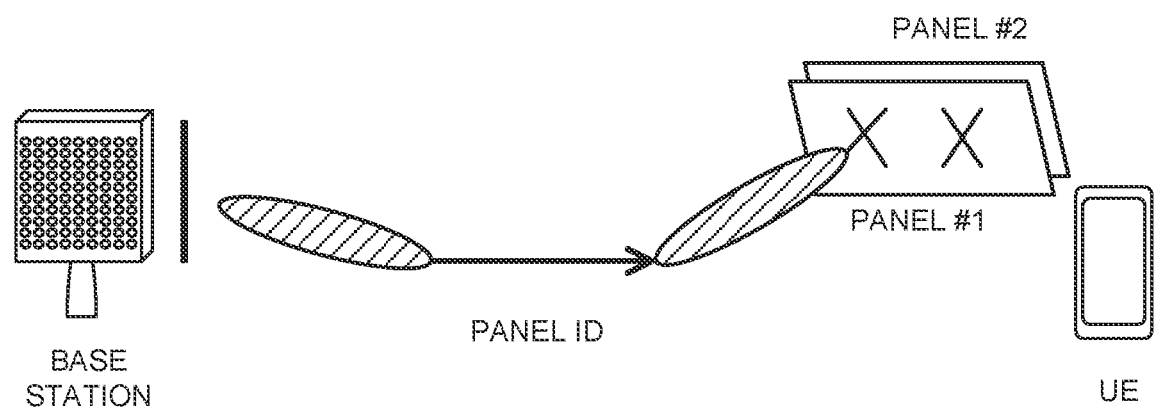
FIG. 2 is a diagram to show a first example of use of panels by a UE.

FIG. 2 is a diagram to show a first example of use of panels by the UE. Assume that the base station has transmitted a panel ID for a target panel (panel #1) to be powered on out of a plurality of panels to the UE. In this case, the UE switches panel #1 to ON and performs transmission/reception of various kinds of signals by using panel #1. Assume that panel #2 is in an OFF state. In the example shown in FIG. 2, the plurality of the panels are not powered on at the same time, and thus power consumption can be suppressed.

Figure 3:
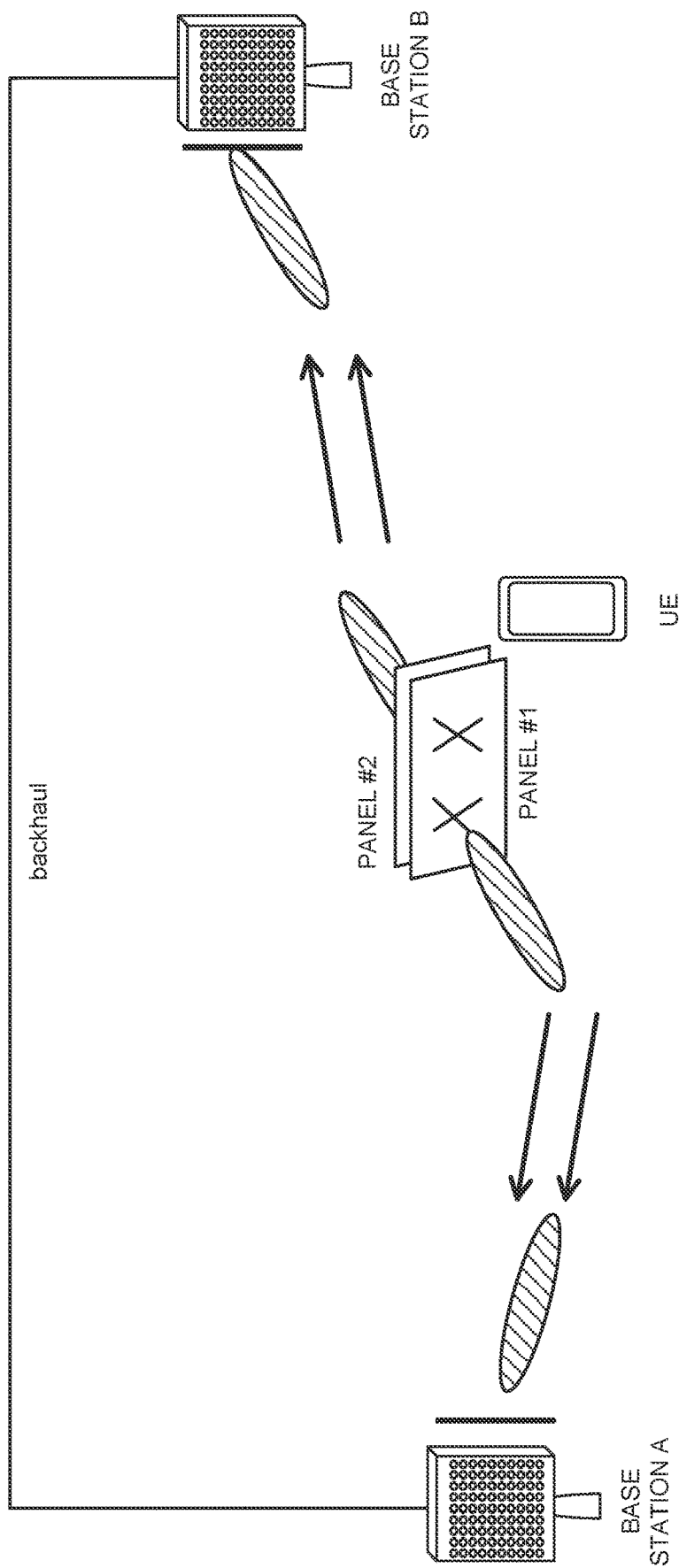
FIG. 3 is a diagram to show a second example of use of the panels by the UE.

FIG. 3 is a diagram to show a second example of use of the panels by the UE. The example shown in FIG. 3 shows a structure including a plurality of base stations and a UE. Assume that a base station A and a base station B are connected to each other by, for example, a high-speed (low-latency) line (Ideal backhaul) or a low-speed (middle-latency) line (Non-Ideal backhaul). Assume that the UE can perform simultaneous transmission/reception via the plurality of the base stations by using the plurality of the panels.

In the example shown in FIG. 3, assume that the UE receives configuration information to power on panel #1 from base station A, and receives configuration information to power on panel #2 from the base station B. The UE performs transmission/reception of a signal via the base station A by using panel #1, and performs transmission/reception of a signal via the base station B by using panel #2. In the example shown in FIG. 3, performing the simultaneous transmission/reception by using the plurality of the panels at the same time can improve performance.

Second Embodiment

In a second embodiment, a UE determines whether a panel is powered on or off on the basis of control by its own terminal (the UE) and switches the panel to ON or OFF. The UE transmits determined content about whether the panel is powered on or off to a base station. The UE performs transmission/reception of a signal by using the panel being powered on.

Letting the number of panels the UE has be M and letting the number of panels the UE can switch be N, $0 \leq N \leq M$ is assumed to be satisfied. In other words, only some of the panels the UE has may be switchable. The UE may semi-statically perform switching of ON/OFF of the panel. In other words, an interval between switching of ON/OFF of the panel may be a certain period or more.

The UE determines whether a specific panel is powered on or off on the basis of implementation of the UE or a specified operation. For example, the UE may determine whether the specific panel is powered on or off on the basis of at least one of an RRM measurement result and an L1 measurement result.

The UE may notify the base station of the determined content about ON/OFF of the panel (state of the panel) by using explicit signaling or MAC CE signaling in notification of uplink control information (UCI).

The base station may implicitly understand the determined content about ON/OFF of the panel of the UE (state of the panel) on the basis of an RRM/L1 measurement report from the UE. For example, when the UE notifies an RRM/L1 measurement result not including beam/panel information about panel j, the base station may understand that panel j is powered off.

The UE may perform processing obtained by combining processing according to the first embodiment with processing according to the second embodiment. For example, when receiving configuration information related to the panel from the base station after switching the panel to ON or OFF on the basis of control by the UE, the UE may switch ON/OFF of the panel on the basis of the configuration information.

For example, the UE determines that the panel is powered off on the basis of the control by the UE, and may subsequently switch the panel to ON on the basis of a base station configuration using a panel ID or activation of an RS corresponding to the panel.

Third Embodiment

In a third embodiment, a UE may receive a signal used for at least one of physical layer (Layer 1 (L1)) measurement, radio link monitoring (RLM), and beam failure detection (BFD) by temporarily (for a certain period) powering on a panel being in a power-off state (determined to be powered off). Alternatively, the UE may not receive all signals with the panel being in the power-off state.

The UE may not perform reception/scheduling of a downlink control channel (Physical Downlink Control Channel (PDCCH))/a downlink shared channel (Physical Downlink Shared Channel (PDSCH)) in the panel being in the power-off state. The UE may not perform monitoring of a control resource set (CORESET) or a search space in the panel determined to be powered off. The UE may not receive (measure) an aperiodic signal (e.g., an aperiodic RS or an aperiodic CSI-RS) in the panel being in the power-off state.

On the other hand, the UE may receive a Configured beam/RS by temporarily powering on the panel being in the power-off state to perform L1 measurement of the beam/RS. A target signal for the L1 measurement may be, for example, at least one of an SS block (Synchronization Signal block (SSB)), a channel state information reference signal (Channel State Information-Reference Signal (CSI-RS)), and an aperiodic/semi-persistent/periodic RS. The UE may receive (measure) at least one of a periodic signal (e.g., an SSB or a periodic CSI-RS) and a semi-persistent signal (e.g., a semi-persistent CSI-RS) by temporarily powering on the panel being in the power-off state.

As described above, the UE performs the L1 measurement by temporarily powering on the panel being in the power-off state, and thus a time for beam management and beam selection for the panel after the panel is changed from OFF to ON can be shortened. For example, the base station may configure/activate a semi-persistent CSI-RS resource set for L1 measurement and report before planning (determining) to power on panel j of the UE. The base station powers on the panel together with configuration of a target beam after receiving the measurement report, and thus the UE can perform quick transmission by using the beam.

The UE may temporarily power on the panel being in the power-off state to receive a signal (SSB/CSI-RS) used for at least one of RLM and BFD by using the panel. The UE may perform at least one of RLM and BFD by using the panel.

Fourth Embodiment

In a fourth embodiment, a UE may transmit a reference signal for measurement (Sounding Reference Signal (SRS)) by temporarily (for a certain period) powering on a panel being in a power-off state (determined to be powered off). Alternatively, the UE may not transmit all signals with the panel being in the power-off state.

The UE may not transmit an uplink control channel (Physical Uplink Control Channel (PUCCH))/an uplink shared channel (Physical Uplink Shared Channel (PUSCH))/an SRS in the panel being in the power-off state. The UE may not transmit an aperiodic signal (e.g., an aperiodic RS or an aperiodic SRS) in the panel being in the power-off state.

On the other hand, the UE may temporarily power on the panel being in the power-off state to transmit an SRS configured for the purpose of beam management by using the panel. The UE may transmit at least one of a periodic signal (e.g., a periodic SRS or a type-1 configured grant PUSCH) and a semi-persistent signal (e.g., a semi-persistent SRS or a type-2 configured grant PUSCH) by temporarily powering on the panel being in the power-off state.

Therefore, a time necessary for UL beam management and beam selection for the panel after the panel is switched from OFF to ON can be shortened. The UE may transmit only an SRS resource/resource set for beam management usage. Usage of the SRS resource/resource set may be antenna switching for the base station to check a UE transmit beam. The usage of the SRS resource/resource set may be both of the beam management and the antenna switching.

According to the embodiments described above, the UE switches ON/OFF of the panel on the basis of configuration information from the base station, control by the UE, or the like without keeping the plurality of the panels in the power on state, and thus it is possible to suppress power consumption of the panel. For example, when a specific panel does not face the base station and is not used, the UE may semi-statically power off the specific panel for power savings.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 4:
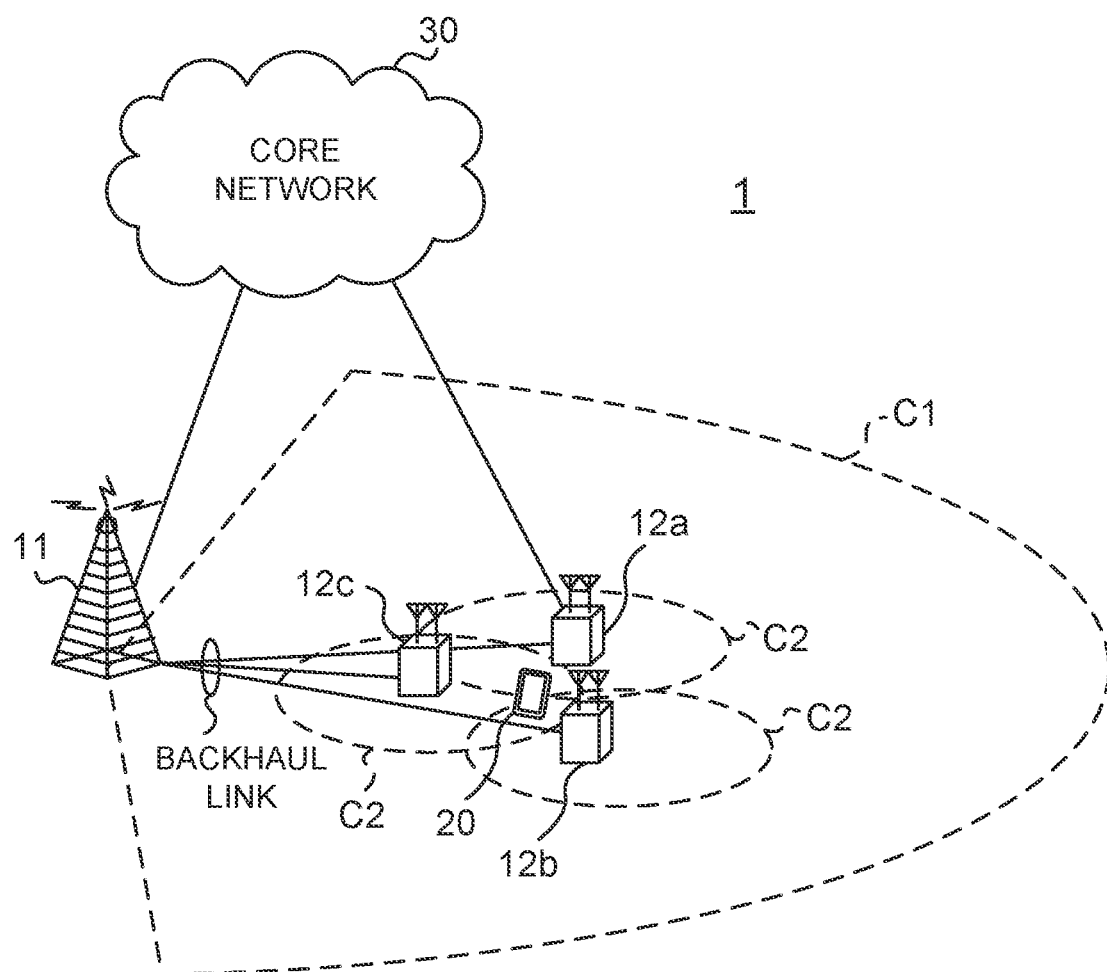
FIG. 4 is a diagram to show an example of a schematic structure of a radio communication system according to one embodiment.

FIG. 4 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 5:
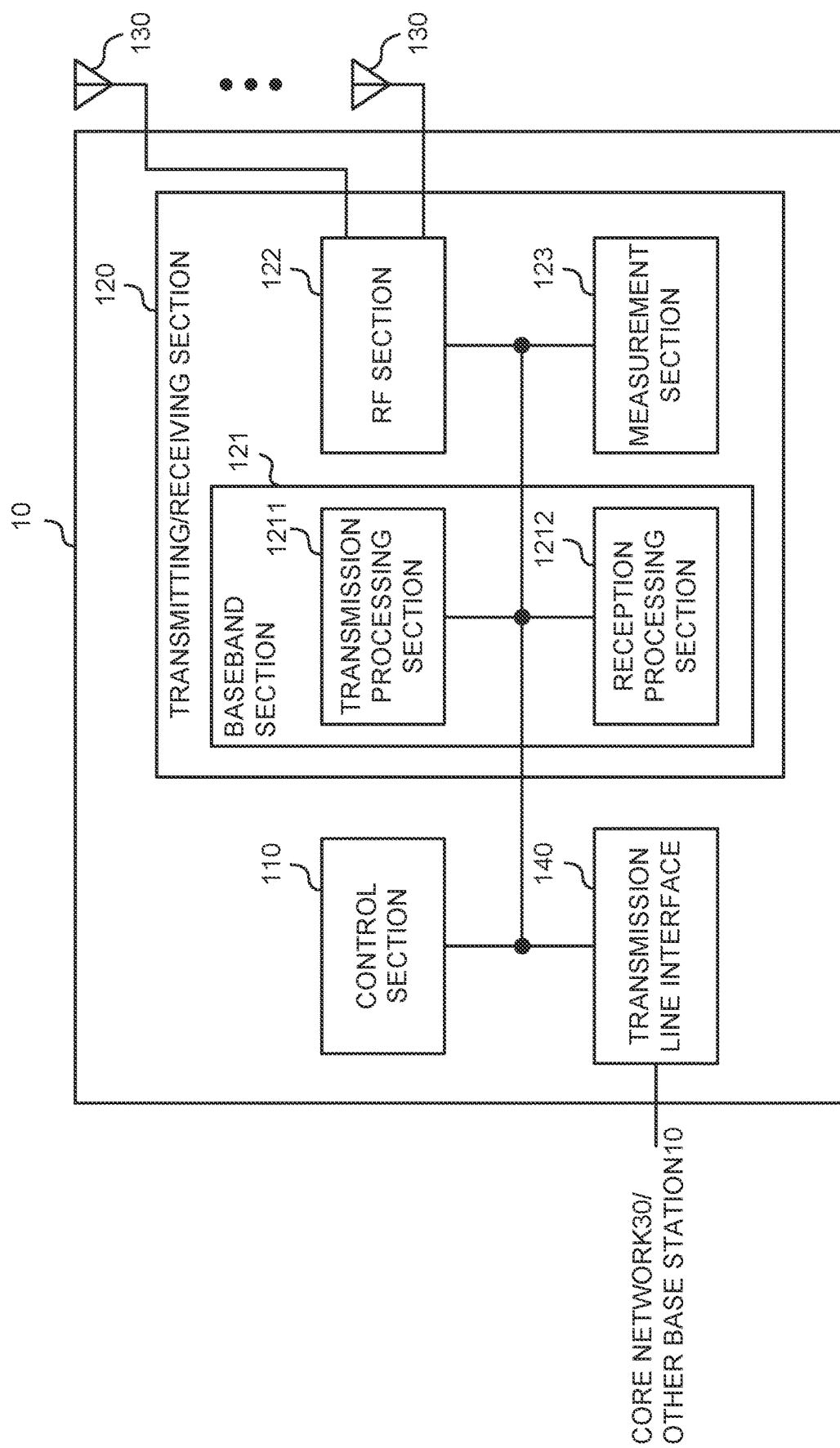
FIG. 5 is a diagram to show an example of a structure of a base station according to one embodiment.

FIG. 5 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing, filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may receive a signal the UE has transmitted by using a panel being powered on, and may transmit a signal to the panel being powered on and included by the UE. The transmitting/receiving section 120 may transmit configuration information related to the panel to the UE. The transmitting/receiving section 120 may receive, from the UE, determined content about whether to power on or off the panel, the determined content being determined on the basis of control by the UE. When a panel of the UE being in a power-off state is temporarily powered on, the transmitting/receiving section 120 may transmit a signal used for at least one of physical layer measurement, radio link monitoring, and beam failure detection. When a panel of the UE being in a power-off state is temporarily powered on, the transmitting/receiving section 120 may receive a reference signal for measurement from the panel.

The control section 110 may determine whether to power on or off a panel of the UE to control so as to transmit configuration information indicating determined content to the UE.

(User Terminal)

Figure 6:
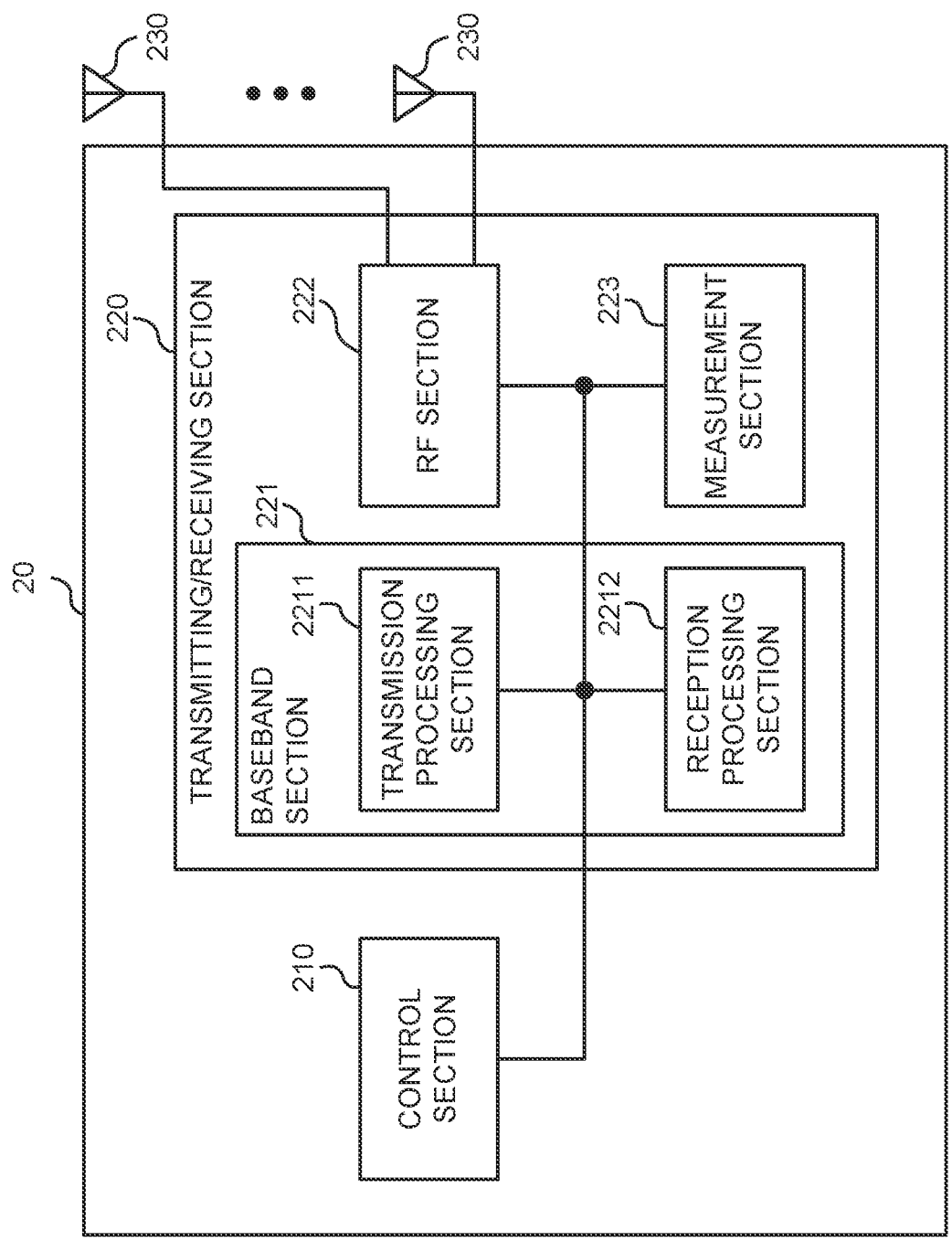
FIG. 6 is a diagram to show an example of a structure of a user terminal according to one embodiment.

FIG. 6 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211 and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the transmitting/receiving section 220 may receive a signal by using a panel being powered on, or may transmit a signal by using the panel being powered on. The transmitting/receiving section 220 may receive configuration information related to the panel from the base station. When whether to power on or off the panel is determined on the basis of control by its own terminal, the transmitting/receiving section 220 may transmit determined content about whether to power on or off the panel to the base station. The transmitting/receiving section 220 may receive a signal used for at least one of physical layer measurement, radio link monitoring, and beam failure detection by temporarily powering on the panel being in a power-off state. The transmitting/receiving section 220 may transmit a reference signal for measurement by temporarily powering on the panel being in a power-off state.

The control section 210 may determine whether each panel of a plurality of panels is powered on or off to control so as and switches the power of panel to ON or OFF. The control section 210 may determine whether the panel is powered on or off on the basis of configuration information transmitted from the base station. The control section 210 may determine whether the panel is powered on or off on the basis of control by its own terminal.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 7:
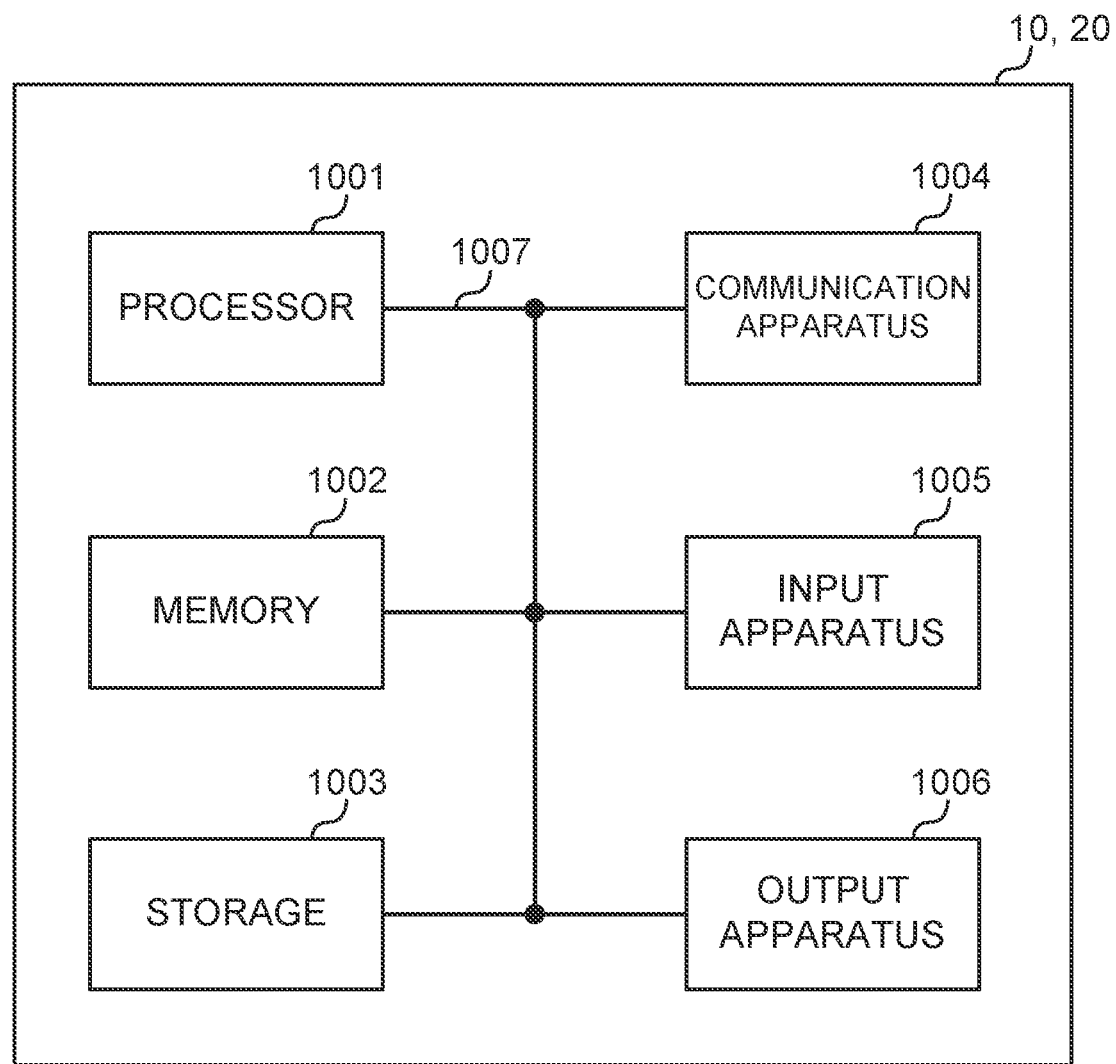
FIG. 7 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 7 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
   a first panel and a second panel;
   a receiver that receives first configuration information for activating the first panel from a first transmission/reception point (TRP) and receives second configuration information for activating the second panel from a second TRP; and
   a processor that:
      activates the first panel based on the first configuration information and performs transmission/reception of a signal with the first TRP using the activated first panel,
      activates the second panel based on the second configuration information and performs transmission/reception of a signal with the second TRP using the activated second panel, and
      performs the transmission/reception with the first TRP and the transmission/reception with the second TRP concurrently.

2. The terminal according to claim 1, wherein the processor:
   deactivates the first panel and the second panel on the basis of control by the terminal, and
   subsequently activates the first panel and the second panel on the basis of the first configuration information and the second configuration information, respectively.

3. The terminal according to claim 2, wherein the processor continues to activate the first panel and the second panel for a certain period, and
   the receiver receives a signal used for at least one of physical layer measurement, radio link monitoring, and beam failure detection during the certain period by using the first panel and the second panel.

4. The terminal according to claim 2, wherein the processor continues to activate the first panel and the second panel for a certain period, and transmits a measurement reference signal during the certain period.

5. The terminal according to claim 1, wherein the processor continues to activate the first panel and the second panel for a certain period, and
   the receiver receives a signal used for at least one of physical layer measurement, radio link monitoring, and beam failure detection during the certain period by using the first panel and the second panel.

6. The terminal according to claim 5, wherein the processor continues to activate the first panel and the second panel for a certain period, and transmits a measurement reference signal during the certain period.

7. The terminal according to claim 1, wherein the processor continues to activate the first panel and the second panel for a certain period, and transmits a measurement reference signal during the certain period.

8. A radio communication method for a terminal, the radio communication method comprising:
- receiving first configuration information for activating a first panel from a first transmission/reception point (TRP) and receiving second configuration information for activating a second panel from a second TRP;
- activating the first panel based on the first configuration information and performing transmission/reception of a signal with the first TRP using the activated first panel;
- activating the second panel based on the second configuration information and performing transmission/reception of a signal with the second TRP using the activated second panel; and
- performing the transmission/reception with the first TRP and the transmission/reception with the second TRP concurrently.

* * * * *